US 8,714,957 B2

(12) United States Patent
Blochmann et al.

(10) Patent No.: US 8,714,957 B2
(45) Date of Patent: May 6, 2014

(54) RAPID-ASSEMBLY BASE MOULD WITH AN ENGAGEABLE HOLDING FORCE ASSIST

(75) Inventors: Erik Blochmann, Neutraubling (DE); Maria Lindner, Hausen (DE); Christian Wittmann, Hemau (DE)

(73) Assignee: Krones AG (DE)

( * ) Notice: Subject to any disclaimer, the term of this patent is extended or adjusted under 35 U.S.C. 154(b) by 274 days.

(21) Appl. No.: 13/276,137

(22) Filed: Oct. 18, 2011

(65) Prior Publication Data

US 2012/0091631 A1   Apr. 19, 2012

(30) Foreign Application Priority Data

Oct. 19, 2010   (DE) .......................... 10 2010 048 720

(51) Int. Cl.
*B29C 33/30* (2006.01)
*B29C 33/32* (2006.01)

(52) U.S. Cl.
USPC ............................ 425/182; 425/522; 425/541

(58) Field of Classification Search
USPC ......................................... 425/182, 522, 541
See application file for complete search history.

(56) References Cited

U.S. PATENT DOCUMENTS

| 7,037,099 | B2 | 5/2006 | Linke et al. ................... 425/182 |
| 2004/0052892 | A1* | 3/2004 | Linke et al. ................... 425/542 |
| 2011/0027409 | A1* | 2/2011 | Stoiber et al. ................. 425/526 |

FOREIGN PATENT DOCUMENTS

| DE | 10 2009 035 871 | 3/2011 | ............. B29C 49/28 |
| EP | 1 299 223 | 4/2003 | ............. B29C 33/30 |
| WO | WO 02/04194 | 1/2002 | ............. B29C 49/54 |

* cited by examiner

*Primary Examiner* — Joseph S Del Sole
*Assistant Examiner* — Lawrence D Hohenbrink, Jr.
(74) *Attorney, Agent, or Firm* — Hayes Soloway P.C.

(57) ABSTRACT

An apparatus for molding plastic preforms into plastic containers, includes at least one blow molding station having a cavity, within which the plastic preforms can be expanded into the plastic containers, wherein the blow molding station includes a base part that delimits the cavity and wherein the base part is releasably mounted on a carrier by a fastening mechanism. The apparatus includes a force application member to which an engageable force can be applied and which generates in a fixed condition of the base part on the carrier a holding force that keeps the base part and the carrier together.

17 Claims, 4 Drawing Sheets

Fig. 3
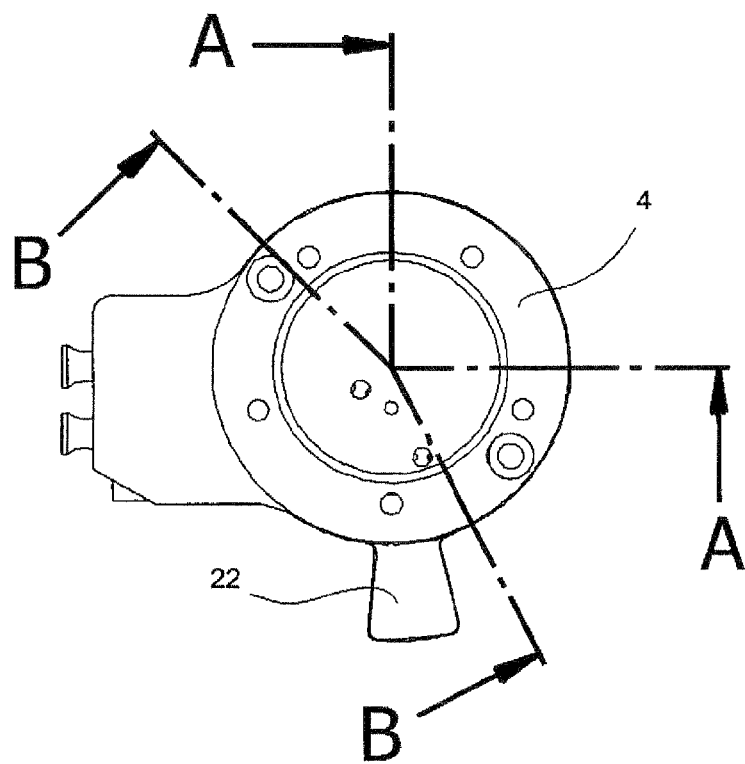
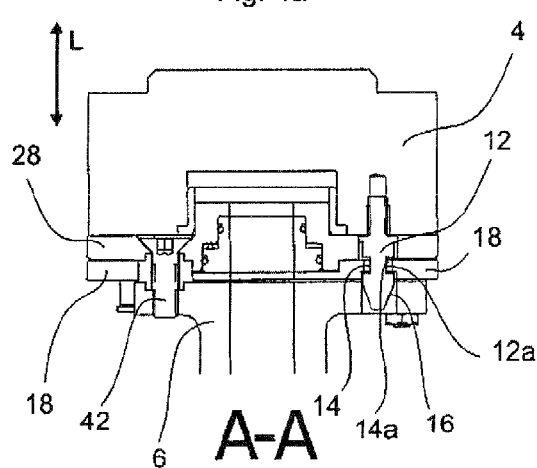
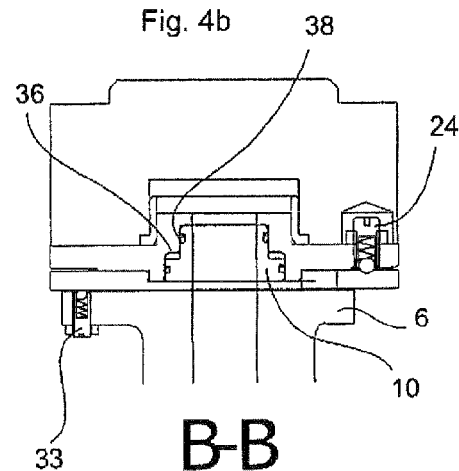

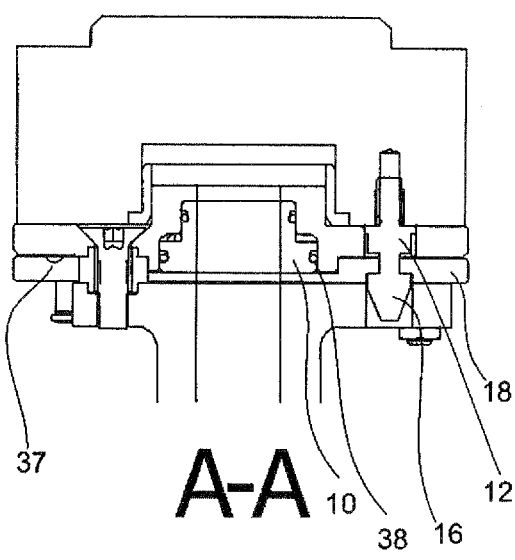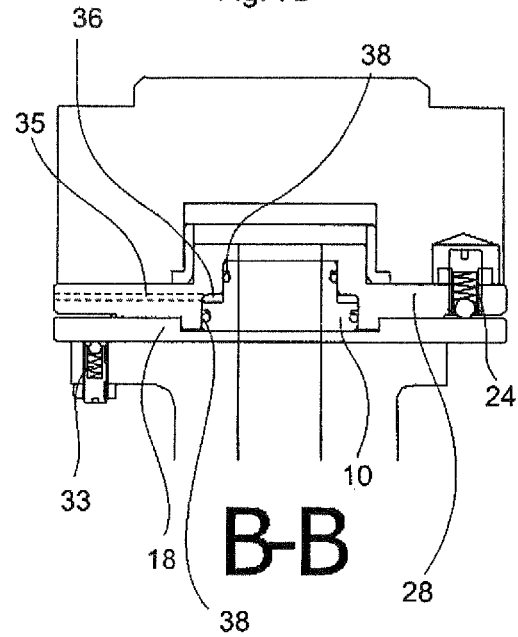

ns provided that is connected to a positioning unit. Here, a coupling profile is used for the connection, which is formed from a coupling member connected to a base plate as well as from a counter member connected to the base member and which can be actuated by means of a manual lever in order to effect a corresponding release of the base insert.

RAPID-ASSEMBLY BASE MOULD WITH AN ENGAGEABLE HOLDING FORCE ASSIST

BACKGROUND OF THE INVENTION

The present application relates to an apparatus for moulding plastic preforms into plastic containers. Such apparatus have been known from the prior art for a long time and usually include a plurality of blow moulding stations which are arranged on a carrier wheel and which are used for moulding plastic preforms into plastic containers by way of blow moulding.

Such blow moulding stations usually include two mould parts which together with a base part delimit a cavity, within which the plastic preforms are expanded. In the case of a set change-over, it is necessary to replace the base parts. In the prior art, the base parts are normally screwed onto a carrier and they therefore need to be disassembled in a relatively complex procedure in the case of an assembly change-over. Further, however, it is necessary for the base parts to be arranged in a stable manner relative to their respective carriers.

From EP 1 299 223 B1, an apparatus for blow moulding containers is known. Here, a base insert is provided that is connected to a positioning unit. Here, a coupling profile is used for the connection, which is formed from a coupling member connected to a base plate as well as from a counter member connected to the base member and which can be actuated by means of a manual lever in order to effect a corresponding release of the base insert.

U.S. Pat. No. 5,750,161 describes a quick change mechanism for a blow moulding unit. Here, a first and a second closing element are provided, wherein the second closing element is movably mounted between a position that is closed with the first closing element and a released position.

In the so far unpublished Patent Application DE 10 2009 035 871.4 of the applicant, a quick change mechanism for base parts is described. Here, the base mould or an adapter piece in communication with the base mould is clamped to a carrier via a rotatable connection piece. This apparatus operates satisfactorily and allows a comparatively rapid assembly and disassembly of the base parts. However, in order to clamp the base part to the carrier, a very strong force already has to be applied so as to achieve the desired final holding force. The subject matter of DE 10 2009 035 871.4 is herewith included in the subject matter of the present application by reference.

The present invention is therefore based on the object of providing a quick change mechanism that requires a force for assembly and disassembly, which is reduced by comparison to the described prior art.

SUMMARY OF THE INVENTION

An apparatus according to the invention for moulding plastic preforms into plastic containers includes at least one blow moulding station including a cavity, within which the plastic preforms can be or are expanded into the plastic containers. This blow moulding station has a base part that delimits the cavity, and this base part is releasably mounted to a carrier by means of a fastening mechanism.

According to the invention, the apparatus or this fastening mechanism includes a force application member (10) onto which an engageable force can be applied, which force application member generates a holding force on the carrier in a fastened condition of the base part, which force holds the base part and the carrier together.

It is therefore proposed to provide a force application member, onto which, if locking is desired, an additional force can be applied in order to generate in this way the required holding force. In this process, this holding force is preferably not generated as a result of the actual fastening process, but can be engaged by the user as and when desired.

Preferably, a flowable medium or a magnetic force can be applied to the force application member. For example, it would be quite possible to supply a flowable medium such as for example pressurised air and to apply in this way the engageable force onto the force application member. It would also be possible for the engageable force to be an engageable magnetic force. Thus, for example, the apparatus could include a permanent magnet or an electromagnet and the force could be engaged by activating the electromagnet, as a result of which the electromagnet and the force application member implemented as a permanent magnet repel each other, and this repulsion in turn effects the holding force. It would also be possible for the force application member itself to be implemented as an electromagnet.

Moreover, it would also be possible for the apparatus to include two repellent permanent magnets and for the force to be engaged in such a way that a distance between the two magnets is reduced. It would also be possible to provide an electromagnet that attracts the force application member upon activation and in this way effects the holding force.

In addition, it would also be possible for the engageable force to be a force that is imparted by an electric field.

In contrast to the described prior art, it is therefore proposed that it is not the user who has to apply all of the necessary assembly force during assembly, but that in particular during a working operation, at least a substantial or a large proportion of the holding force is also generated by the force application member onto which the flowable medium can be applied or onto which in general the engageable force can be applied. It is possible here for the force application member to be moved, for example by pressurised air, i.e. pneumatically, into a position in which it causes the base part and the carrier to be kept together.

The force application member can here preferably be moved in order to obtain a holding force relative to at least one further component of the fastening mechanism and in particular relative to the base part. Particularly preferably, the force application member can be moved in a straight direction and in particular in the direction, along which also the base part is moved towards the lateral parts of the blow mould or away therefrom during working operation. Preferably, the holding force is generated by a pressure applied by the flowable medium.

However, it would also be possible for a negative pressure or a vacuum to be used which generates said holding forces. Said holding force can act here directly between the base part and the carrier, however, it would also be possible and is in fact preferred for the holding force to be generated between other members, for example on the one hand between members mounted on the carrier and on the other hand members that are disposed on the base part.

It would be possible here if pressure or air pressure was applied to the force application member during working operation.

In an advantageous embodiment, the fastening mechanism includes at least one pin-like body disposed on a first fastening member, which body engages in a groove positioned in a second fastening member in a fastened condition of the base part on the carrier, with said pin-like body advantageously being displaceable relative to the groove. As a result of this engagement of the pin-like body in the groove, the fastening members can be orientated relative to each other. In this way, a temporary fixing or a preliminary fixing can be achieved by this mounting operation. Advantageously, however, the fastening member with the groove located therein is moved during the fixing operation.

In a further advantageous embodiment, the groove is designed in such a way that an end section of the pin-like body can pass through the groove in a first area and cannot pass through the groove in a second area of the groove. In this way, the groove may for example be designed like a keyhole, wherein for placing the base part on the carrier, the pin-like bodies can advantageously enter into the groove and can, for the ultimate retention thereof, preferably be in engagement with said groove. For example, the pin-like body can include at least one recess on the outer circumference thereof or can have a reduced cross section in the area of this recess. In this connection, the recess is preferably continuously formed in the pin-like body. Advantageously, the recess is designed in such a way with regard to the cross section that it can be completely displaced within the groove mentioned above. Thus, this recess comes into engagement with the groove or the edges of the groove and the pin-like body can in this way essentially no longer be moved relative to the groove in the second area of the groove in the longitudinal direction thereof or can only be moved along the width of said groove.

In a further advantageous embodiment, the base part is disposed on an adapter member and the adapter member is mounted on the carrier via the fastening mechanism. By means of this adapter member, different height movements of the base part relative to the blow moulding station or relative to the lateral parts can be compensated.

In a further advantageous embodiment, the at least one pin-like body is in communication with the base part. It is possible here for the pin-like body to be disposed directly on the base part, however, it would also be possible for the pin-like body to be disposed on the above-mentioned adapter member and this adapter member in turn on the base part. In this way, too, the pin-like body is in (indirect) communication with the base part.

In a further advantageous embodiment, the fastening element is rotatably arranged relative to the base part. It is possible here to rotate the fastening member about a predefined rotary axis so as to release the base part, however, it would also be possible to rotate the base part itself in order to effect the release thereof.

In a further advantageous embodiment, the apparatus includes at least one spring element for prestressing the pin-like body relative to the first fastening member. In a preferred embodiment, the fastening member is the above-mentioned adapter member. In this case, the pin-like body is prestressed relative to the fastening member and is preferably prestressed towards this first fastening member.

In a further advantageous embodiment, the first fastening member is disposed so as to be rotatable about a predefined rotary axis. Advantageously, the above-mentioned grooves extend at least partially and preferably completely in the circumferential direction of the fastening member. In this way, a release of the base part can be achieved by rotating the fastening member. Advantageously, a lever is provided on the second fastening member, by means of which the user can achieve a turning of the first fastening member.

In a further advantageous embodiment, a support body is provided between the first fastening member and the second fastening member in a mounted condition of the base part. Thus it is possible for the support body itself to be disposed in a stationary condition and for the base part to be placed on top of this support body. The base part can be locked relative to the carrier by turning the second fastening member without having to be rotated itself in the process. Preferably, the pin-like body/bodies extend(s) through the support body. This support body is advantageously used for centering the base part.

In a further advantageous embodiment, the apparatus includes at least two pin-like bodies that are spaced apart from each other. Correspondingly, preferably at least two grooves are provided in which the two pin-like bodies extend. In this way, a particularly stable locking of the base part is made possible.

Preferably, the two pin-like bodies are arranged opposite each other with respect to a rotary axis of the second fastening member. The grooves, too, are advantageously arranged point-symmetrically in relation to a rotary axis.

In a further advantageous embodiment, channels for guiding a flowable medium are provided within the first fastening member. This flowable medium may here in particular be a cooling medium for cooling the base part. Corresponding cooling channels may here be provided also in the base part itself.

Providing these channels for guiding a flowable medium also facilitates a quick assembly of the base part, since it becomes possible in this way not only to assemble the base part itself very quickly, but at the same time also to establish or close the necessary coolant connections.

Advantageously, therefore, fluid connectors are provided on the first fastening member, which extend in a longitudinal direction of the pin-like body. In this way, also the fluid connectors can be inserted into corresponding couplings when placing the base part on the second fastening member, so that in one operation also the coolant connection is established.

The engagement of the pin-like body in the groove, however, is here not used to generate the holding force during working connection, but only in order to build up a preliminary pressure or a preliminary holding force.

In a further advantageous embodiment, the force application member applies a force that urges the fastening member and the support body apart, in a condition in which a flowable medium is applied thereto. As a result of this urging-apart force, the holding force of the base part on the carrier can be achieved, as will be explained in more detail below.

Advantageously, a channel for the flowable medium is provided in the support body or in the fastening member. This channel is advantageously provided completely in the support body or completely in the fastening member. The flowable medium is in particular air, so that the force application member is enabled by said air pressure to exercise its force. Advantageously, said channel for the flowable medium extends in a radial direction.

In a further advantageous embodiment, the force application member is a piston member that is movable relative to the support body, and the flowable medium can be applied to a space between the support body and the piston member. As a result of this action on said space, the piston member can be moved away from the support body. Advantageously, the piston member is sealed relative to the support body above and below said space. To this end, for example the piston member can have a circular cross section as well as sealing means such as O-rings. This space is advantageously arranged in a ring shape around an area of the piston member. In this way, a uniform application of pressure onto the piston member becomes possible.

In a further advantageous embodiment, a prestressing means is provided between the support body and the second fastening member, which prestressing means urges the fastening member and the support body apart. As a result of this urging apart of the fastening member and the support body, the base part is fastened to its carrier, as will be explained in more detail below.

Advantageously, the apparatus also includes a reservoir for supplying a liquid medium, such as in particular pressurised air. In doing so, for example, the pressure levels that are also used for the blow moulding process may be provided for fastening the base part and the carrier. In this connection, the force by which the base part is held on the carrier may advantageously be a function of a relative position between the fastening member and the support body. Advantageously, however, the force that is applied by said prestressing means is lower than the force that is applied by the force application member during working operation. In this way it is achieved that the resistance a user has to overcome in order to release or mount the base part, is kept comparatively low.

In a further advantageous embodiment, the apparatus includes a second prestressing means which urges the carrier and the second fastening member apart. This second prestressing means may also be a spring. Advantageously, this second spring is weaker than the above-mentioned first spring and is preferably also weaker than the pressure that can be applied by the force application member.

In a further advantageous embodiment, the second fastening member is designed to be rotatable about a predefined rotary axis. This means that locking of the base part is achieved as a result of a rotary movement of said second fastening member.

In a further advantageous embodiment, the second fastening member is arranged to be longitudinally displaceable with regard to a predefined axis. This means that the base part can be locked by way of a pushing movement of said second fastening member.

The present invention is further directed to a method for fastening a base part of an apparatus for forming plastic preforms into plastic containers to a carrier. According to the invention, a holding force between the carrier and the base part is generated or increased here by applying a flowable medium to a force application member. To this end, the flowable element and in particular air is advantageously applied to an air space between the force application member and the fastening member. This holding force is advantageously generated during a working operation of the apparatus.

In a further advantageous method, a further holding force between the carrier and the base part is generated by a fastening mechanism, and this further holding force is lower than the force generated by the application of the force application element.

BRIEF DESCRIPTION OF THE DRAWINGS

Further advantages and embodiments will become evident from the attached drawings, wherein:

FIG. 3 shows a schematic top view of a base part;

FIGS. 4a, 4b show two views of a base part in an assembled condition and in a disassembled condition;

FIGS. 7a, 7b show two views of the base in a fixed and prestressed condition in which it is also under the effect of an operating force.

DETAILED DESCRIPTION OF THE INVENTION

Figure 1:
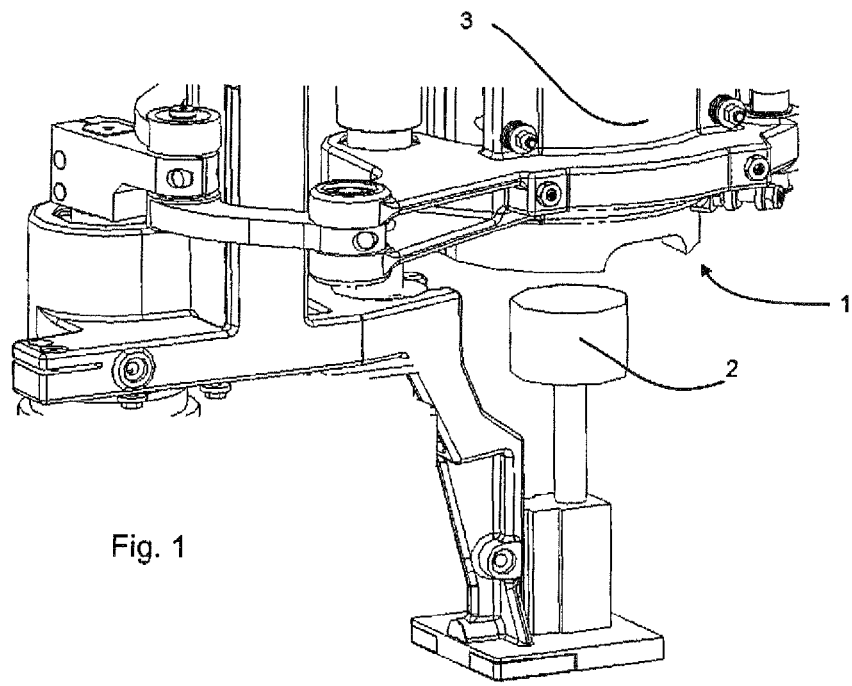
FIG. 1 shows a perspective partial view of a blow moulding station of an apparatus according to the invention.

FIG. 1 shows a partial view of a blow moulding station 1 according to the invention. This blow moulding station 1 has here lateral parts 3 (only partially shown), which together with a base part 2 (schematically shown) delimit a cavity (not shown). Reference numeral 1 identifies here the blow moulding station in its entirety. An apparatus according to the invention can comprise a plurality of blow moulding stations, which may for example be arranged on a common carrier wheel.

Figure 2:
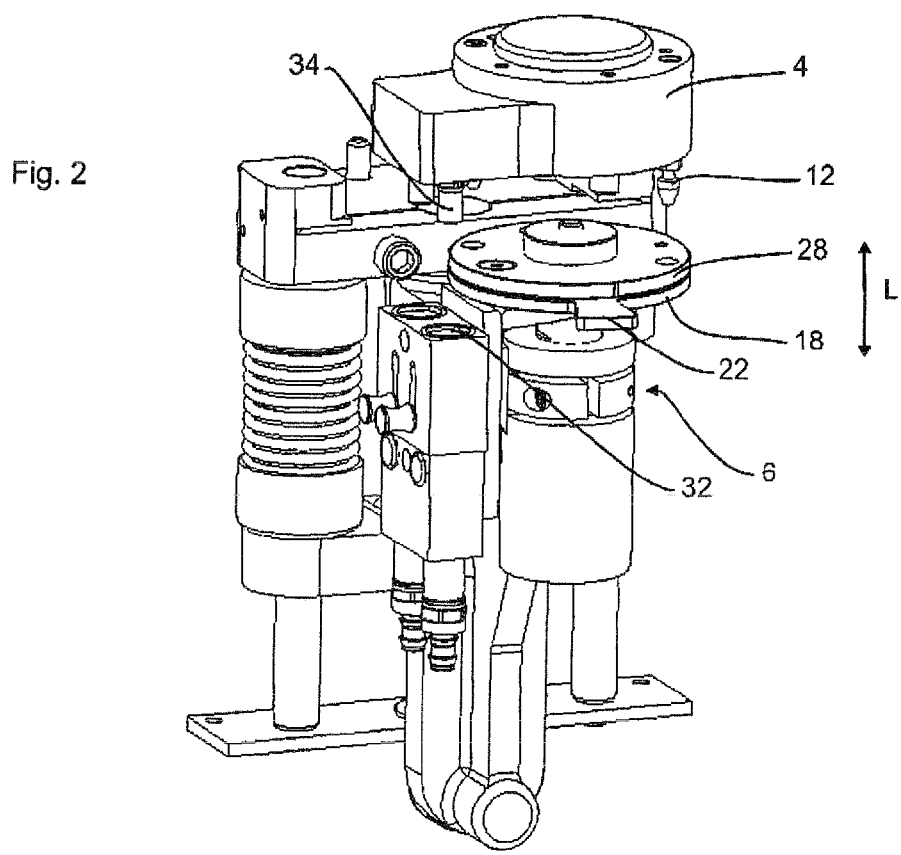
FIG. 2 shows a detailed view of a locking mechanism.

FIG. 2 shows a first view for illustrating the fastening mechanism. Here, an adapter member 4 is provided on which the base part (not shown) is fastened. On this adapter member 4, two pin-like bodies 12 are provided, of which however only one pin-like body 12 can be seen. Further, a connector 34 is provided on the adapter member 4, which connector is used for supplying liquid and in particular water to the coolant line located within the adapter member 4. The adapter member 4 is here at the same time also the first fastening member in terms of the above description. Reference numeral 18 relates to the second fastening member, which is here a locking disk that is rotatably mounted about a stationary cylinder pin.

Reference numeral 28 relates to a support body that is disposed in a mounted condition between the adapter member 4 and the second fastening member 18. Reference numeral 22 identifies a lever for rotating the second fastening member 18. Reference numeral 6 identifies in its entirety the carrier on which the base part is disposed.

On the carrier 6, in turn, the support body 28 is advantageously fixedly mounted. Reference numeral 32 relates to couplings into which the connectors 34 are inserted in a longitudinal direction L of the pin-like bodies 12.

FIG. 3 shows a top view of part of an apparatus according to the invention, more specifically the adapter member 4 of the base part. FIG. 1 shows here a situation in which the locking disk, i.e. the second fastening member 18 (cf. FIG. 2), is open, i.e. in which the base can be attached or removed. The following figures respectively show sections along the lines A-A or B-B of FIG. 3.

FIG. 4a shows a section along the line A-A of FIG. 3. Here, too, the adapter member or the first fastening member 4 can be seen, which is indirectly disposed on a carrier 6. This carrier 6 constitutes here a fixed unit that is fastened to the blow moulding station or the machine and that carries out the lifting movement for closing the blow mould. In the upper area of this carrier, a rotatable locking disk that can be height-adjusted along the longitudinal direction L is disposed, which may here be the second fastening member 18.

Above the second fastening member 18, a support body 28 or the base mould receptacle is provided. This support body 28 is fixedly mounted by means of fastening members 42 (such as screws) and also fixedly mounted in terms of its height (i.e. with regard to the longitudinal direction L) in relation to the carrier 6. However, the second fastening member 18 is, as was mentioned, movable in its height to a certain extent between the carrier plate 28 and the carrier 6, i.e. movable in the direction of the double arrow L.

Reference numeral 12 relates to a pin-like body that is mounted on the first fastening member 4. The pin-like bodies 12 may here be rigidly mounted on the first fastening member 4, however, it would also be possible for them to be prestressed relative to the first fastening member 4 using spring elements. The pin-like bodies 12 include a head 16 and a narrowed area 12a.

In order to attach or remove the base, the pin-like body 12 can enter through a corresponding groove 14, more specifically through a section 14a of this groove in the second fastening member 18. In the open position as shown in FIGS. 4a and 4b, the second fastening member 18 is further pushed upwards by spring elements 33 as shown in FIG. 4b, so that the pin-like body 12 or the locking pin can pass through the bore 14 and initially a gap to the carrier 6 continues to remain.

Figure 5A:
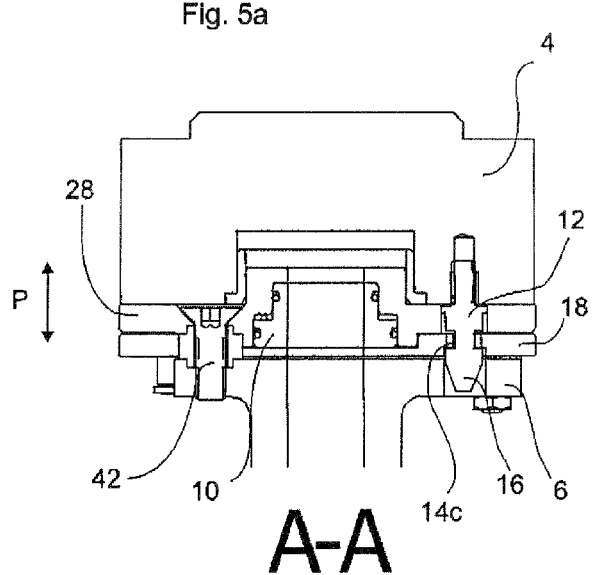
FIGS. 5a, 5b show two views of the base part in a fastened condition.
Figure 5B:
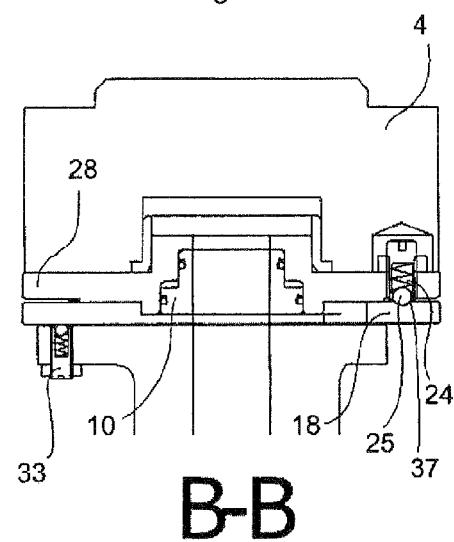

FIGS. 5a and 5b show the fixing process for the base part. To this end, the second fastening member 18 is rotated and in this way the pin-like bodies 12 are guided via this rotary movement into the groove 14 which is designed as a keyhole-shaped groove. During the rotary movement, a certain gap 14c is still provided between the second fastening member 18 and the pin-like body 12 which, however, is reduced during the fixing operation and is correspondingly enlarged during the release operation.

Further, by rotating the second fastening member 18 it is achieved that a spring element 24 pushes the carrier plate 28 and the second fastening member 18 apart with an increasing force. To this end, spring means 24 as well as a ball 25 running in a groove are provided. This groove is positioned in the embodiment shown as an inclined surface and as a screw surface 37. The pin-like bodies 12 will then bear against the second fastening member 18 in a prestressed condition. It will then no longer be possible to release the base part from the carrier 6, however, the prestress effected by the spring elements 24 is too small for the working operation. The prestressing force of the spring elements 24 is deliberately selected to be so small that the forces for locking, i.e. for moving the second fastening member 18, will not become too high.

Figure 6A:
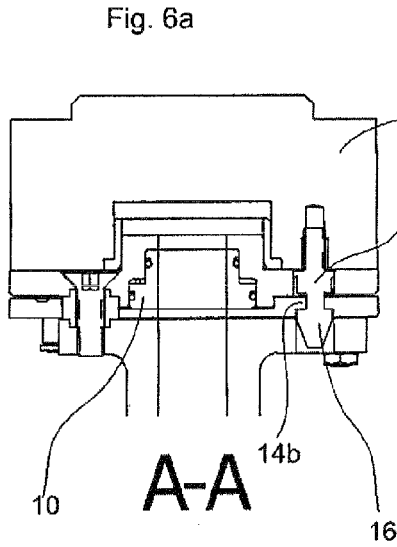
FIGS. 6a, 6b show two views of a base part in a fixed and prestressed condition.
Figure 6B:
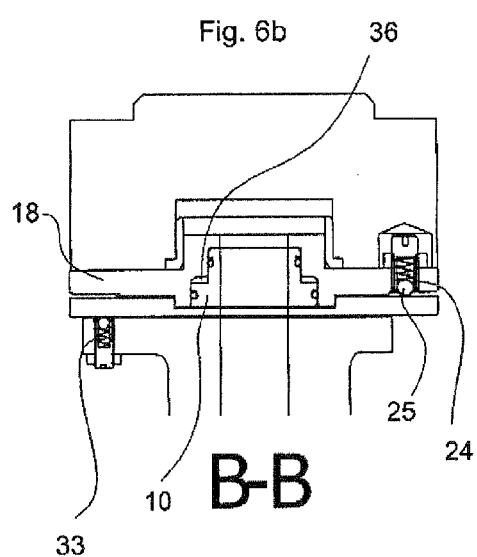

Further, the second fastening member 18 is pushed downwards by the force of the spring element 33. In this way, in the situation as shown in FIGS. 6a and 6b, the first fastening member 4 and thus also the base part is prestressed and fixed. The ball 25 will now be in its end position, where a force in an order of magnitude of between 150 N and 250 N, preferably between 180 N and 240 N, acts. The counterforce of the spring element 33 amounts to approximately 80 N.

Apart from that it would also be possible for the grooves to be formed with inclined surfaces in the fastening member 18 itself, and in this way a preliminary fixing of the base part is achieved as a result of a rotation of the second fastening member 18.

In the situation shown in FIGS. 7a and 7b, the force application member 10 is additionally moved downwards and exercises a further force in the order of magnitude of approximately 500 N, which urges the carrier plate 28 and the second fastening member 18 apart. As a result of this force, the pin-like bodies 12 are downwardly loaded and thus the first fastening member 4 is fixedly disposed on the carrier 6. The force application member or the piston 10 is here moved downwards by means of a pneumatic air supply 35 that supplies an air space 36. Reference numeral 38 relates to sealing means for sealing the space 36. The air pressure for moving the piston can here be provided from the annular channels or reservoirs which also provide the pressurised air for example for expanding the plastic containers. If the base part is to be released again, the piston member 10 is first relieved, subsequently the second fastening member can be rotated back into the opening position and finally the base part can be removed from the carrier 6.

The air space 36 is here formed between the force application member 10 and the support body 28. Advantageously, the air space 36 is designed in the shape of an annular channel. In case pressurised air is applied, the force that is uniform in the circumferential direction is applied to the force application member 10, and this force moves said member downwards relative to the support body and thus urges the support body 28 and the second fastening member 18 apart, and the acting force is determined by the air pressure in the air space 36.

Thus, for the working operation, the application member 10 in the form of the pneumatically actuated piston is then additionally engaged, which counteracts the generated operating loads (e.g. by accelerating the base mould masses).

The applicant reserves the right to claim all of the features disclosed in the application documents as being essential to the invention, in as far as they are novel over the prior art either individually or in combination.

LIST OF REFERENCE NUMERALS

1 Blow moulding station
2 Base part
3 Lateral parts
4 Adapter member, first fastening member
6 Carrier
10 Force application member, piston
12 Pin-like body
12a Narrowed area of the pin-like body
14 Groove, bore
14a Section of the groove
14c Gap
16 Head
18 Second fastening member
22 Lever
24 Spring element
25 Ball
28 Support body, support plate
32 Coupling
33 Spring element
34 Connector
35 Supply line to the air space
36 Air space
38 Sealing means
42 Fastening member
A-A Lines
B-B Lines
L Longitudinal direction

The invention claimed is:

1. An apparatus for moulding plastic preforms into plastic containers, comprising at least one blow moulding station having a cavity, within which the plastic preforms can be expanded into plastic containers, wherein the blow moulding station includes a base part that delimits the cavity and wherein the base part is releasably mounted on a carrier using a fastening mechanism, wherein the apparatus includes a force application member to which an engageable force can be applied and which generates in a fixed condition of the base part on the carrier a holding force that keeps the base part and the carrier together, and wherein the engageable force applied to the force application member comprises a flowable medium or a magnetic force.

2. The apparatus as claimed in claim 1, wherein the fastening mechanism includes at least one pin-like body disposed on a first fastening member, which pin-like body engages in a fixed condition of the base part on the carrier in a groove located in a second fastening member, said pin-like body being displaceable relative to the groove.

3. The apparatus as claimed in claim 2,
wherein the groove is designed in such a way that an end section of the pin-like body can pass through the groove in a first area of the groove and cannot pass through the groove in a second area of the groove.

4. The apparatus as claimed in claim 1,
wherein a support body is provided between a first fastening member and a second fastening member in a mounted condition of a base part.

5. The apparatus as claimed in claim 4,
wherein the force application member exercises a force urging the second fastening member and a support body apart in a condition in which the flowable medium is applied thereto.

6. The apparatus as claimed in claim 3,
wherein a channel for the flowable medium is provided in a support body or in the second fastening member.

7. The apparatus as claimed in claim 3,
wherein the force application member is a piston element movable relative to a support body and the flowable medium can be applied to a space between the support body and the piston element.

8. The apparatus as claimed in claim 3,
wherein a recess for receiving the force application member is provided in a support body.

9. The apparatus as claimed in claim 3,
wherein a prestressing device is provided between a support body and the second fastening member, which prestressing device urges the second fastening member and the support body apart.

10. The apparatus as claimed in claim 9,
wherein the apparatus includes a second prestressing device which urges the carrier and the second fastening member apart.

11. The apparatus as claimed in claim 1,
wherein a first fastening member is disposed to be rotatable about a predefined rotary axis (X).

12. A method for fastening a base part of an apparatus for moulding plastic preforms into plastic containers on a carrier,
wherein by applying an engageable force onto a force application member, a holding force is generated or increased between the carrier and the base part.

13. The method according to claim 12, wherein holding force is generated or increased by applying a flowable medium onto the force application member.

14. The method according to claim 13, wherein the flowable medium is a liquid medium.

15. The method according to claim 13, wherein the flowable medium is pressurized air.

16. The apparatus according to claim 1, wherein the flowable medium is a liquid medium.

17. The apparatus according to claim 1, wherein the flowable medium is pressurized air.

* * * * *